United States Patent [19]
Correll et al.

[11] Patent Number: 5,193,299
[45] Date of Patent: Mar. 16, 1993

[54] REALISTIC SWIMMING FISH LURE

[76] Inventors: Robert P. Correll, P.O. Box 57 Benedict Ave., Benedict, Md. 20612; Joseph H. Gribble, 13109 River Terr., Lusby, Md. 20657

[21] Appl. No.: 682,361

[22] Filed: Apr. 9, 1991

[51] Int. Cl.⁵ ............................................. A01K 85/00
[52] U.S. Cl. ................... 43/42.47; 43/42.24; 43/42.45
[58] Field of Search ................. 43/42.48, 42.47, 42.37, 43/42.24, 42.27, 42.45

[56] References Cited

U.S. PATENT DOCUMENTS

| | | | |
|---|---|---|---|
| 2,517,298 | 8/1950 | Gaylord | 43/42.47 |
| 2,561,515 | 7/1951 | Keeler | 43/42.47 |
| 2,927,392 | 3/1960 | Lievense | 43/42.47 |
| 3,203,132 | 8/1965 | Kotis | 43/42.47 |
| 3,445,953 | 5/1969 | Dailey | 43/42.47 |

FOREIGN PATENT DOCUMENTS 2422328 12/1979 France ............ 43/42.47

Primary Examiner—Kurt C. Rowan
Attorney, Agent, or Firm—Richard C. Litman

[57] ABSTRACT

A fishing lure is molded of flexible plastic in the shape of an actual fish. The front or head region of the lure includes an internal brace or plate of metal. The rear or tail region of the lure has only the flexible plastic material. As the lure is towed under water by the fishing line, the massive and rigid head region swims straight onward, while the flexible and light-weight tail region waves back and forth in the water stream, imitating the propulsive tail motions of a living, swimming fish. This make the lure realistic. The caudal or tail fin includes a deflection plate along its lower edge which encourages swimming by setting up vortices in the water. Stabilizing fins or wings project horizontally from either side of the head region adjacent the brace, which flap and dampen any tendency toward pitching oscillations. The lure may be shaped and colored to resemble a particular species of fish. A hook may be molded into the brace, and project out from the plastic body.

4 Claims, 2 Drawing Sheets

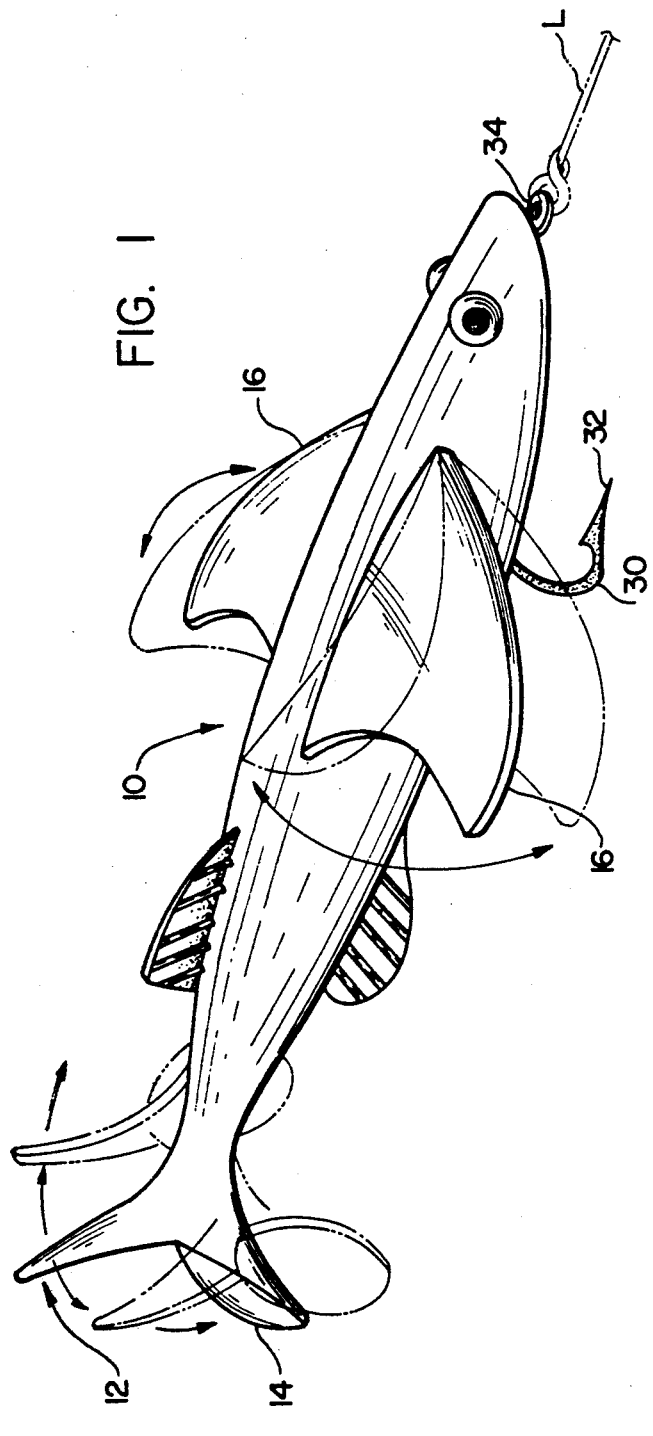
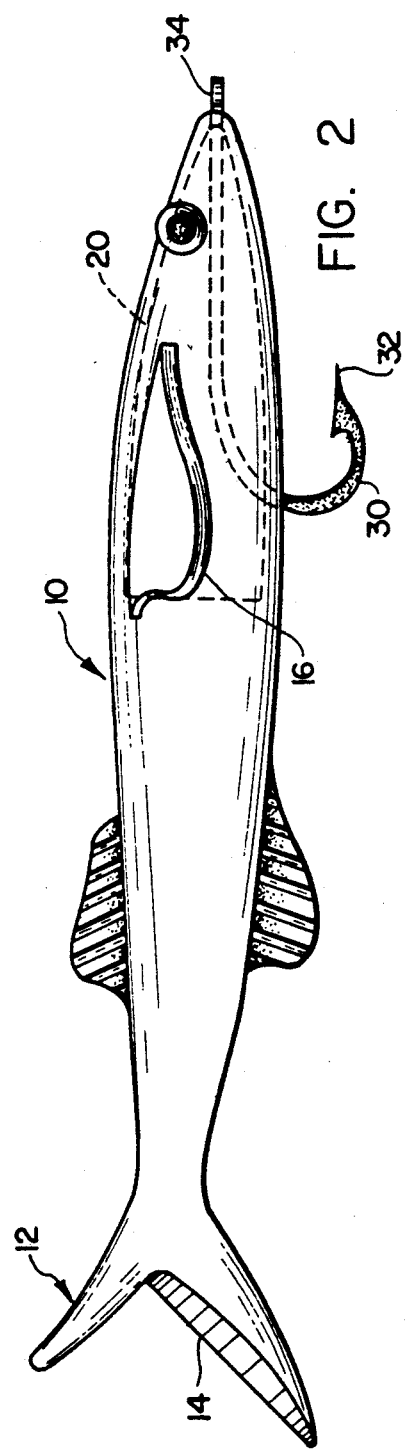

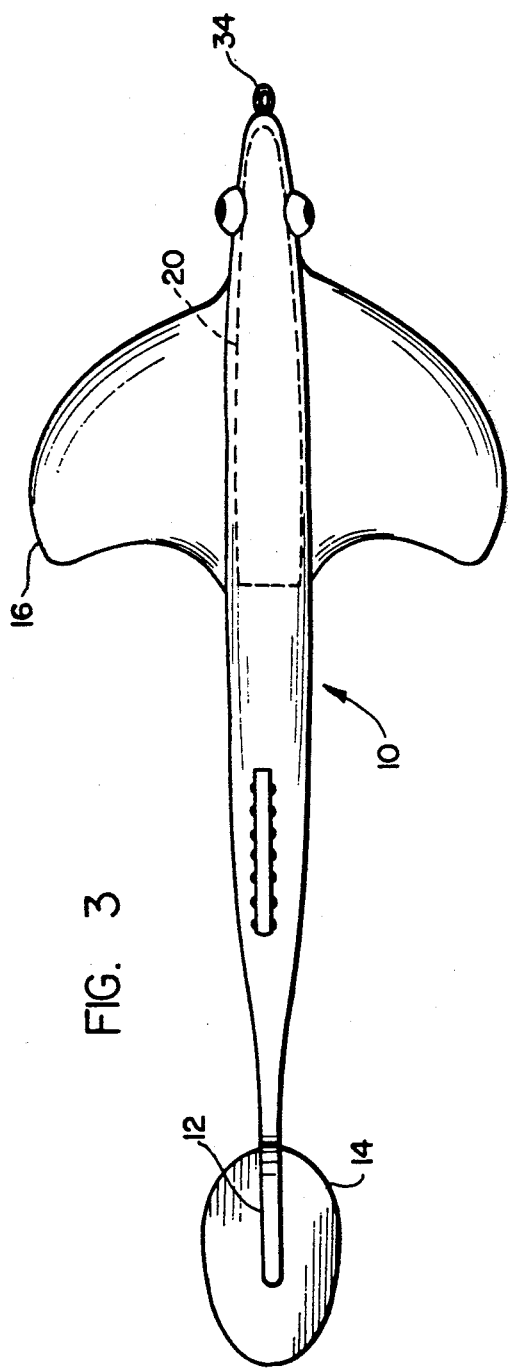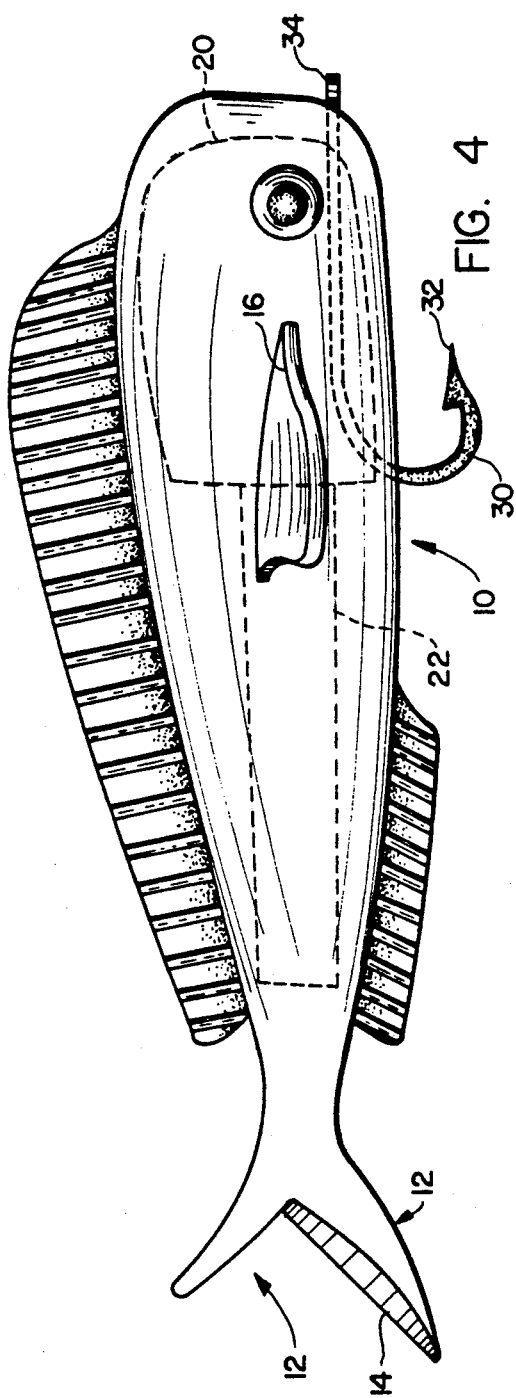

REALISTIC SWIMMING FISH LURE

FIELD OF THE INVENTION

The present invention relates to fishing lures which resemble actual fish and which execute swimming motions when pulled through the water on a line.

DESCRIPTION OF THE PRIOR ART

Fishing lures are widely used as bait to attract a game fish to a hooked line. (The term "game fish" in this application and in the following claims is conveniently used to denote a fish which a person is attempting to catch, whether that fish is sought for sport, for food, or for any other reason.) A fish which is being chased by the game fish, but not by the person trying to catch the game fish, will be denoted as a "hunted fish". The lure of the present invention imitates a hunted fish, not a game fish.

All lures are designed to attract game fish by their appearance and motion, which deceive a game fish into thinking that it is hunting a real fish for food. Unlike baits which are actual food (such as worms or previously caught fish) these visual lures have artificial scent. Their success depends on the visual cues and the scent which they send to the game fish.

Visual lures often do not resemble an actual hunted fish except in a very general way. They may be a flat piece of metal cut to vaguely fish-like outline, for example. These lures depend on coloration, their swimming motion, and perhaps the nearsightedness of some fishes. Depending on the details of design, such lures may swim more or less as a living hunted fish does. To encourage wiggling or oscillatory motion, they may be hinged near their center points, or include a scoop or inclined member to set up vortices in the water flowing over the towed lure. Such lures are generally constructed of rigid material.

U.S. Pat. No. 2,883,786 of Smith, and U.S. Pat. No. Des. 269,900 of Shiverdecker, show typical lures of this type. Shiverdecker uses a pair of inclined planar wings extending from the lure body, much like the pectoral fins of a fish.

Another type of lure is realistic enough in appearance to be indistinguishable from a real fish at a few feet away. These lures are usually made of plastic injected into an accurately shaped and detailed mold, and colored. They may be shaped and colored to resemble one of an actual species of fish, which is preyed upon by the game fish. Such a lure may also be made as a realistic, but generalized fish which is not an exact replica of any one species. The plastic material is often relatively flexible.

Such lures are disclosed in U.S. Pat. No. 3,879,882 of Rask, and in U.S. Pat. No. 3,070,917 of D. E. Rowe, Sr. Rask teaches a flexible steel or nylon wire running through the lure body from the mouth to the tail fin, where a hook is attached. Rowe shows a hook disposed within the body, with the point of the hook protruding.

Weaver, in U.S. Pat. No. 4,783,928, shows a flexible lure with an embedded hook. The hook is bent around to pierce another portion of the lure body, to form a loop. This structure does not resemble a real fish.

Molded lures, which are relatively thick on account of their realistic shapes, are often made hollow. The hollow structure makes them stiff even when made of plastic which is relatively flexible. These lures are commercially available.

Despite the static realism of these visually precise lures, their actual performance is frequently disappointing. Due to the poor hydrodynamics of their bodies, they do not "swim" as a living fish does. When towed on a fishing line through the water, they may violently pitch, diving and shooting up alternately; go straight to the surface and skip along there like a flying fish; roll and go through the water belly up, or lie on their sides; execute wild corkscrew motions; and the like. A living hunted fish of course does none of these things, and these unnatural motions no doubt give away to the game fish the fact that the lure is not food, which results in poor fishing with these lures.

Thus, despite the clear advantages of making a lure which visually resembles an actual fish both in static appearance and in swimming motion, the prior art reveals no lure which accomplishes these two complementary goals. The long-felt need for a realistic swimming lure has not led to its development, because the realistic lure cannot be achieved by projective design.

For many years the technology has been available to inexpensively mold a fish-like lure realistic in appearance and shape. To make such a lure swim realistically is not easy, though. The hydrodynamics of a body towed through water, which is the basis of designing a fish lure which swims, is complex and difficult to calculate. At low towing speeds the lure may assume an unnatural angle: as speed picks up, oscillations will usually set in, but the exact sort of oscillations is hard to predict. As speed picks up more, the oscillations may become violent or have new modes of oscillation superimposed upon them; the motion may even become "chaotic" in many cases. To predict the streamlines and vortices of the water flowing over the lure is a job for a physicist with a computer, if it can be done at all. In the case of chaotic motion, prediction is impossible and regularity totally lacking.

Because of these difficulties, experiment is the only method available to determine if a lure will swim. It would seem that commercially available lures were not tested or developed by such experiments, because they do not swim, and do not catch game fish well.

The realistic but stiff lures, even if they assumed an upright attitude (which they may not), and even if they yawed to and fro (which they generally do not), would still not resemble a living hunted fish. A lure, to swim as a hunted fish does, must move its tail fin back and forth in the horizontal plane, so as to imitate the propulsive motions of the living hunted fish. Since this is the basic swimming motion of real fish, it is also the basic oscillatory motion which is desired in a lure. Moreover, a lure must bend in and out of a smooth curve in the horizontal plane in order to swim realistically.

One example of a lure which encourages this motion is that described in U.S. Pat. No. 3,068,604 issued to S. Nyberg. Nyberg uses a solid molded lure body shaped as a real fish. Such a realistically thick solid body is heavy and stiff. To allow the tail to oscillate, a deep circumferential groove is cut into the side of the body just ahead of the dorsal fin. The groove leaves a thin waist section of the plastic body, which acts as a solid hinge between the thick body sections on either side of the grooves. A cotton cord is molded into the body through the thin waist section to strengthen the lure.

This method of allowing the tail fin to move suffers from several drawbacks. First, the deep circumferential groove is of course not found on a living fish, and so the game fish may turn away from the lure on seeing it. Also, even if the lure swims upright, the visual impression to the game fish will be that of a mechanical device, not a living being; the two rigid body pieces, bending stiffly from a midpoint, clearly do not resemble the smooth sinuous motions of a real swimming fish, whose body gracefully curves in motion. Also, since the head and tail sections are of roughly equal mass, the head is likely to oscillate as widely as the tail; this is also an unnatural motion.

Nyberg discloses no structure to encourage swimming-like yawing motions of the tail, and it is not clear that the tail section of Nyberg would actually yaw to a fro.

The lure preferably should have a structure to positively set up oscillatory yawing motions.

One method used in existing lures to encourage oscillation is a deflection plate along the upper edge of the lower branch of the caudal (tail) fin. In prior art lures, this plate has been shown to encourage to and fro oscillations of the caudal fin of a lure. Such a plate is used on some commercially available hollow plastic lures.

U.S. Pat. No. 3,879,882 of Rask, mentioned above, employs a similar structure to encourage tail yawing. Rask's realistic, flexible fish body has a flat, angled "stabilizer member" across the caudal fin.

None of the above inventions and patents, taken either singly or in combination, is seen to describe the instant invention as claimed.

Accordingly, one object of the present invention is a fishing lure which resembles a living hunted fish in appearance.

A further object is a lure which swims as does a living fish, upright and in a straight line.

Another object is a lure which may be molded without internal voids or external grooves or crevices.

Still another object is a fish-like lure which when swimming bends its body in a curve resembling the curve which the body of a swimming, living fish assumes.

An additional object is a fish-like lure in which the head section oscillates less than the tail section.

A final object is a lure which is internally weighted to strengthen the body and to avoid external weights, which detract from the realism of the lure.

These and other objects of the present invention will become readily apparent upon further review of the following specification and drawings.

SUMMARY OF THE INVENTION

The present invention is a fishing lure which is molded of solid flexible plastic to realistically resemble an actual fish. The front or head region of the lure includes a rigid internal brace or plate of metal. The rear or tail region of the lure includes only the flexible plastic material, and optional flexible reinforcement such as nylon webbing. As the lure is towed under water by the fishing line, the massive and rigid head region swims straight onward, while the flexible and light-weight tail region waves back and forth in the water stream, imitating the propulsive tail motions of a living, swimming fish. This yawing oscillation of the tail makes the lure realistic in motion as well as in appearance, and attracts game fish to it.

The caudal or tail fin includes a deflection plate along the upper edge of the lower branch which encourages the yawing tail motions.

Horizontal fins or wings project from either side of the head region adjacent the brace. These tend to keep the fish under water. They also flap or flutter and dampen any tendency toward pitching oscillations.

The lure may be shaped and colored to resemble either a living species of fish, or a generic hunted fish. A hook may be molded into the brace, and project out from the plastic body.

BRIEF DESCRIPTION OF THE DRAWINGS

FIG. 1 is a perspective view of an embodiment of the lure based upon a generalized or generic fish, showing the plastic body. The caudal fin and pectoral fins or wings are shown in phantom in alternate positions.

FIG. 2 is an elevation perspective of the lure of FIG. 1.

FIG. 3 is a perspective plan view of the lure of FIG. 1, showing the horizontal fins and the caudal plate. The internal brace is shown by dotted lines.

FIG. 4 is an elevation perspective view of a lure which resembles a particular species of fish, the dolphin fish.

Similar reference characters denote corresponding features consistently throughout the attached drawings.

DETAILED DESCRIPTION OF THE PREFERRED EMBODIMENTS

The present invention is a fishing lure which externally resembles a living fish. The lure may be modeled on a particular species of fish, having the same shape, coloration and size as that species, or, it may be a generic fish which combines elements of the size, shape and coloration of various species, but which still has the generalized appearance of an actual fish. The lure shown in FIGS. 1–3 is a generic fish.

If a person is fishing for a particular species of game fish, the lure may be modeled on a particular species of hunted fish which that game fish preferentially feeds on. The lure shown in the drawing FIG. 4 is modeled on a dolphin fish.

In the case of either generic or species fish, the lure is comprised basically of a molded plastic body 10. The material of the body 10 may be any which is water proof, flexible and tough, such as vulcanized rubber, urethane, PVC, and the like. Either natural or artificial materials may be used. Color pigments, reinforcing fibers such as Kevlar or fiberglass, or other additives may be mixed with the material as desired. The body 10 may be injection molded with thermoplastic plastic, or thermosetting materials can used and the plastic allowed to cure in the mold. Any molding method or material is acceptable.

(The lure is preferably not hollow, but rather is solid. A hollow body will tend towards stiffness too great for proper motion. However, a hollow molded body is within the scope of the present invention.)

Preferably, the body 10 will be colored to resemble the model species of fish (or colored generically for a generic fish). The color may be painted on, incorporated during molding, etc.

Surface and texture details such as scales, gill slits, and fin bones may be molded into the lure for realism.

Inside the body 10 is a brace 20. The brace 20 stiffens and weights the front or head end of the lure, which contains it. The brace 20 is preferably of a metal such as steel or lead. Other materials, such as a plastic, can also be employed. The brace 20 must be more rigid than the material of the body 10, and is preferably more dense.

Thus, if plastic is used, metal particles can be added to the brace plastic material.

The overall density of the lure may be adjusted to make it sink, float, or have neutral density in either fresh or salt water, as is found to help the lure to swim properly.

The brace 20 does not extend back appreciably into the tail region of the lure, which must remain flexible in order to swish back and forth in the water stream.

Flexible reinforcing structures may be molded into the body 10. One example of such a structure might be a "backbone" of nylon strapping running along the length of the body 10. Such a reinforcing structure 22 is shown in phantom in FIG. 4. Preferably, the flexible reinforcing structure would be firmly attached to the brace 20 for strength.

Ordinarily the brace 20 will be contained entirely inside the body 10, as this is convenient for molding a realistic fish shape around a brace of arbitrary shape. However, the lure will not function differently if the brace 20 were to be inserted as plug into a hole through the body 10, or otherwise comprise part of the surface of the lure. The brace could also comprise two plates, one attached on either side of the front or head region of the lure. The lure could still be made to resemble a fish by appropriately shaping the external portions of the brace 20 and painting the lure. Also, the entire head region of the lure could be one rigid piece, with the flexible rear section attached to it at a waist.

The brace may be cut from metal plate, or be cut to length from bar stock. It can be molded or cast. The brace 20 may be any desired shape which will stiffen the head region.

A hook 30 is preferably attached to the lure for hooking the game fish. The hook includes a barbed point 32 and an eye 34 for tying on a fish line L. The hook is preferably steel.

The hook 30 will pass through the center of the brace 20 if both are centrally located in the body 10. If the brace 20 is made of cast metal (e.g., lead) the hook 30 can be placed in the mold and the metal poured around it to embed the hook 30. The hook 30 and brace 20 may also be machined from a single plate of steel. Other assembly methods can be used.

In the following claims, "hook means" indicates either a hook, or, a place or structure for hook attachment to the body 10 of the lure. The extension of the hook through the lure body as shown in the drawing is not an essential element of the invention.

To increase the realism the eye 34 may be just inside the surface of the body 10, or inside a mouth opening, to hide the eye and knotted fishing line L.

The rear portion of the body 10, behind the brace 20, is molded of a very flexible material. As the lure is towed through the water, this portion of the body is easily driven to yaw back and forth by the flow of water over the caudal or tail fin 12. To encourage this oscillation, a deflection plate 14 is attached or molded into the tail fin 12.

The plate 14 may be attached as shown, across the upper edge of the lower branch of the tail fin 12. It may also be attached along an outer edge, and may be angled in any of various ways which will encourage oscillation. Generally, the plane of the plate 14 should be normal to the plane of symmetry of the lure body 10 (that is, the bilateral symmetry plane of the hunted fish) but inclined to the length of the body 10.

The deflection plate 14 acts in the following way. As water flows over the plate, the flow exerts a force upward on the plate 14, in the same way that a water flow exerts a sideways force on an immersed board which is angled to the current. Any slight irregularity in the tail fin position, or in the flow, will tend to slightly twist the plate 14. The flexible body 10 is easily twisted. Any twisting of the plate 14 causes a force sideways, which further twists the plate 14, causing in turn a greater force. The plate swerves to one side. But, as soon as it has traveled far enough, the angle changes and the force disappears. Then the fin 12 changes angle, and swings to the other extreme. The resulting large oscillations of the tail fin 12 imitate the motion of a fish.

The motion is indicated by phantom views of the tail fin 12 and plate 14 in FIG. 1.

The oscillations are made more natural by the smooth curving of the flexible body 10 as the tail fin 12 and the plate 14 swing from side to side. Since the front part of the body 10 is more massive, it will tend to follow a straight line and maintain its heading: this further increases the realism.

Since the plate 14 is not a natural part of a fish, but may be needed to set up the oscillations, it may be left uncolored if the material of the body 10 is transparent.

The plate 14 may be differently sized, shaped and placed, and may be replaced by any other structure which sets up oscillations in the rear portion of the body 10.

Another structure which helps the lure to swim properly is a wing 16 on either side of the body 10. These wings will rapidly flap or flutter as water flows over the lure, by an action similar to that activating the plate 14. Their oscillation is permitted by their flexibility: stiff or rigid wings, such as found on some prior art lures, will not permit such motion.

The flapping of the wings 16 helps to stabilize the motion of the lure. The rapid oscillations set up small vortices which prevent the formation of the large vortices, associated with violent pitching motions of prior art lures, by drawing off their energy. In a similar manner, the oscillations of the tail fin 12 help to stabilize the lure.

Preferably, the wings are shaped as shown, with a convex curve on the leading edge and a concave shape on the trailing edge. The leading edge may be defined as the edge which water first contacts as it flows over the wing. This encourages a slight twisting motion associated with vortices at the outer ends of the wings.

The wings may be placed so as to coincide with the pectoral fins of the fish, to make the lure more realistic.

The wings are preferably pitched forward, slightly inclined to the length of the body 10 and the horizontal path of the lure. This keeps the lure at a depth by counteracting the upward component of force of the fishing line attached to the lure.

It is to be understood that the present invention is not limited to the sole embodiment described above, but encompasses any and all embodiments within the scope of the following claims.

We claim:

1. A lure for use with a fishing line, said lure resembling a fish, said lure comprising:

a flexible body having the shape of a fish, said body including a head region and a flexible tail region movable relative to said head region;

a rigid brace within said head region for stiffening said head region;

hook means;

fishing line attachment means; and a pair of flexible thin wings extending from said body adjacent said head region, each of said wings having a leading edge facing said fishing line attachment means and a trailing edge facing said tail region, said wings lying generally in a horizontal plane, said wings adapted to oscillate in a flow of water over said lure, said wings being movable relative to said body and also relative to and independently of said movable tail region;

each of said wings having a convex leading edge and a concave trailing edge and said horizontal plane being inclined to the flow of water over said lure, to force said lure downward.

2. The lure as in claim 1, wherein said head region is more massive than said tail region.

3. The lure as in claim 1, including structural means for oscillating said tail region when said lure moves through water.

4. The lure as in claim 3, wherein said means for oscillating said tail region includes a vertical tail fin at a rear end of said tail region, and a deflection plate attached to said tail fin, said deflection plate inclined to a direction of flow of water over said lure, said deflection plate perpendicular to a plane of symmetry of said lure.

* * * * *